US010067022B2

(12) United States Patent
Nakagawa et al.

(10) Patent No.: US 10,067,022 B2
(45) Date of Patent: Sep. 4, 2018

(54) ABSOLUTE PRESSURE SENSOR

(71) Applicant: DENSO International America, Inc., Southfield, MI (US)

(72) Inventors: Kazuhisa Nakagawa, Kariya (JP); Brett Thomas, Flint, MI (US)

(73) Assignee: DENSO International America, Inc., Southfield, MI (US)

( * ) Notice: Subject to any disclaimer, the term of this patent is extended or adjusted under 35 U.S.C. 154(b) by 118 days.

(21) Appl. No.: 15/229,895

(22) Filed: Aug. 5, 2016

(65) Prior Publication Data
US 2018/0038752 A1    Feb. 8, 2018

(51) Int. Cl.
*G01L 9/04*    (2006.01)
*G01L 9/00*    (2006.01)

(52) U.S. Cl.
CPC .......... *G01L 9/0051* (2013.01); *G01L 9/0052* (2013.01); *G01L 9/0055* (2013.01); *G01L 9/0057* (2013.01)

(58) Field of Classification Search
None
See application file for complete search history.

(56) References Cited

U.S. PATENT DOCUMENTS

| | | | | |
|---|---|---|---|---|
| 4,291,293 A | * | 9/1981 | Yamada | G01L 9/0054 257/419 |
| 4,295,115 A | * | 10/1981 | Takahashi | G01L 19/0069 257/E29.324 |
| 7,380,459 B1 | * | 6/2008 | Sapir | G01L 9/0022 73/702 |
| 8,267,486 B2 | | 9/2012 | Sammoura et al. | |
| 8,637,943 B1 | | 1/2014 | Yang | |

* cited by examiner

*Primary Examiner* — Andre Allen
(74) *Attorney, Agent, or Firm* — Harness, Dickey & Pierce, P.L.C.

(57) ABSTRACT

An absolute pressure sensor assembly configured to generate a pressure output representing pressure of a target media modified to take into account pressure loss of a sensor cavity of the absolute pressure sensor.

9 Claims, 2 Drawing Sheets

ABSOLUTE PRESSURE SENSOR

FIELD

The present disclosure relates to absolute pressure sensors.

BACKGROUND

This section provides background information related to the present disclosure, which is not necessarily prior art.

Absolute pressure sensors are widely used to measure pressure of various media, such as air, oil, fuel, hydraulic fluid, etc. While current absolute pressure sensors are suitable for their intended use, they are subject to improvement. For example, some absolute pressure sensors may become less accurate over time due to various environmental factors. For example, multiple pressure or thermal cycles can fatigue absolute pressure sensors, which may result in pressure loss of the sensor's vacuum-sealed cavity—an issue commonly known as "offset drift." Absolute pressure sensors capable of accommodating offset drift, thereby improving sensor accuracy, would thus be desirable. The present teachings advantageously provide absolute pressure sensors that reduce or eliminate sensor inaccuracies cause by offset drift, and provide numerous additional advantages as one skilled in the art will recognize.

SUMMARY

This section provides a general summary of the disclosure, and is not a comprehensive disclosure of its full scope or all of its features.

The present teachings provide for absolute pressure sensors configured to generate a pressure output representing measured pressure of a target media modified to take into account pressure loss of a sensor cavity of the absolute pressure sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
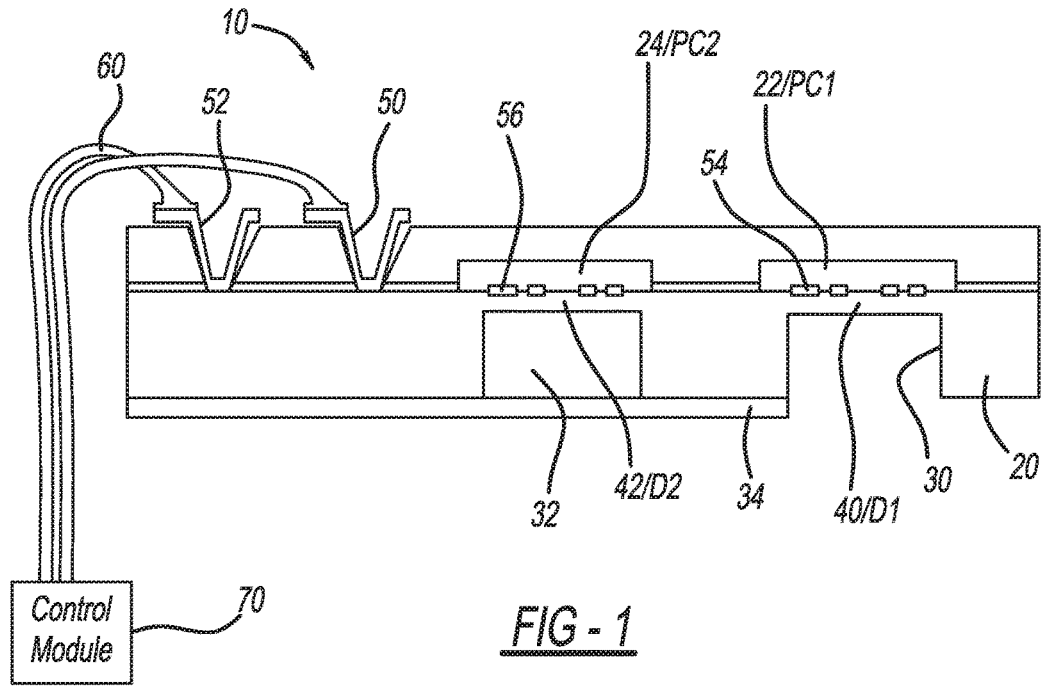
FIG. 1 illustrates a pressure sensor assembly according to the present teachings.

With initial reference to FIG. 1, an absolute pressure sensor assembly according to the present teachings is generally illustrated at reference numeral 10. The sensor assembly 10 can be configured to measure pressure of any suitable pressure media, such as, but not limited to, air, gas, oil, hydraulic fluid, etc. The sensor assembly 10 generally includes a sensor substrate or wafer 20, which can be made of any suitable material, such as silicon.

The sensor substrate 20 defines a sensor cavity 22 and an error cavity 24. The sensor cavity 22 and the error cavity 24 are spaced apart from each other, and are both included with the sensor substrate 20. The sensor cavity 22 is sealed and pressurized at pressure PC1. The error cavity 24 is sealed and pressurized at pressure PC2, which is equal to the pressure PC1 of the sensor cavity 22.

Opposite to the sensor cavity 22 is a sensor counter-cavity 30. Opposite to the error cavity 24 is an error counter-cavity 32. The sensor counter-cavity 30 is exposed to the media to be measured. The error counter-cavity 32 is sealed closed with a cover 34 and is pressurized at pressure PCal2, as described herein. The cover 34 can be made of any suitable material, such as glass or silicon. The error counter-cavity 32 is sealed under vacuum conditions at pressure PCal2, as described further herein.

Between the sensor cavity 22 and the sensor counter-cavity 30 is a sensor pressure diaphragm 40. Between the error cavity 24 and the error counter-cavity 32 is an error pressure diaphragm 42. The diaphragms 40 and 42 are portions of the sensor substrate 20 that flex in response to pressure changes. Each one of the sensor diaphragm 40 and the error diaphragm 42 include electrodes 50 and 52 respectively associated therewith. The electrodes 50 and 52 are respectively coupled to any suitable strain gauge configured to measure individual flexion of the diaphragms 40 and 42. Any suitable strain gauges can be used. For example, the sensor diaphragm 40 (also referred to herein and in the drawings as D1) can include sensor resistors 54, and the error diaphragm 42 (also referred to as D2) can include error resistors 56. The resistors 54 and 56 can be bonded to, diffused into, or connected in any suitable way to their respective diaphragms 40 and 42. Under pressure induced strain, resistive values of the sensor resistors 54 and 56 changes. The sensor resistors 54 are connected as a Wheatstone Bridge, the output of which is directly proportional to the pressure applied to the sensor diaphragm 40. Likewise, the error resistors 56 are connected as a Wheatstone Bridge, the output of which is directly proportional to the pressure applied to the error diaphragm 42. Any suitable number of sensor resistors 54 and error resistors 56 can be used. For example, four sensor resistors 54 and four error resistors 56 can be used (as illustrated in FIG. 1), or two sensor resistors 54 and two error resistors 56 can be used.

Connectors 60 are connected to the sensor electrodes 50 to conduct outputs from the sensor resistors 54 to a control module 70. The connectors 60 are also connected to the sensor electrodes 52 to conduct outputs from the error resistors 56 to the control module 70. In this application, the term "module" may be replaced with the term "controller" or "circuit." The term "module" may refer to, be part of, or include processor hardware (shared, dedicated, or group) that executes code, and memory hardware (shared, dedicated, or group) that stores code executed by the processor hardware. The code is configured to provide the features of control module 70 described herein. For example, the control module 70 is configured to modify sensor readings of the sensor resistors 54 to account for pressure loss of the sensor cavity 22.

Figure 2:
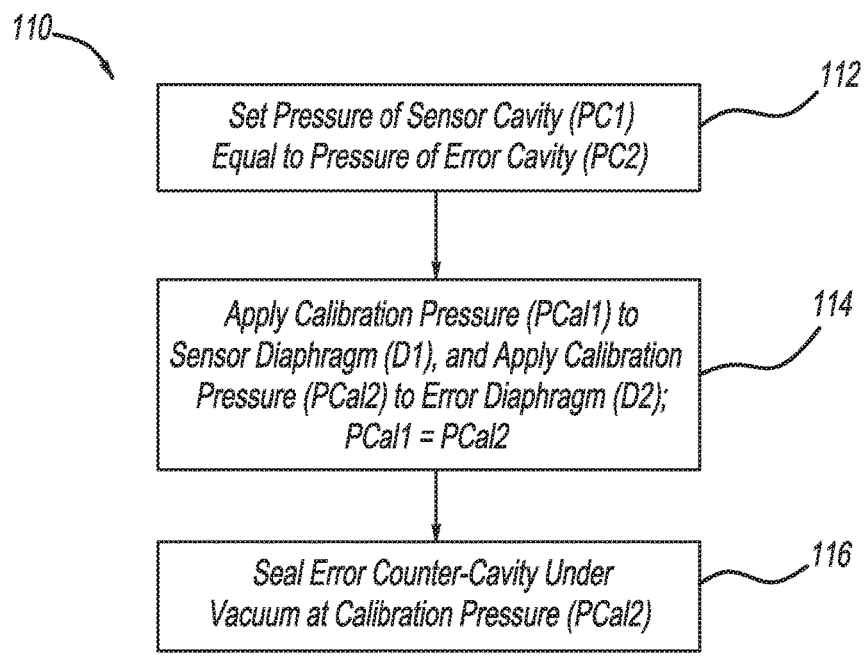
FIG. 2 is a method for calibrating the pressure sensor assembly of FIG. 1.

With continued reference to FIG. 1 and additional reference to FIG. 2, a calibration method 110 according to the present teachings for calibrating the pressure sensor assembly 10 will now be described. Although the calibration method 110 is described as a method for calibrating the pressure sensor assembly 10, the calibration method 110 can be used to calibrate any other suitable pressure sensor assembly. With initial reference to block 112, the calibration method 110 includes setting the pressure PC1 of the sensor cavity 22 to be equal to the pressure PC2 of the error cavity 24. The pressures PC1 and PC2 can be set to any suitable pressure.

With reference to block 114, calibration pressure PCal1 is applied to the sensor diaphragm 40/D1. The calibration pressure PCal1 is applied to the sensor diaphragm 40 on a side thereof that is opposite to the sensor cavity 22 and at the sensor counter-cavity 30. Calibration pressure PCal2 is applied to the error diaphragm 42 to a side of the error diaphragm 42 that is opposite to the error cavity 24, which is where the error counter-cavity 32 is. The calibration pressure PCal2 is applied to the error counter-cavity 32 prior to the error counter-cavity 32 being sealed with the cover 34. The calibration pressures PCal1 and PCal2 are equal to one another, and can be any suitable pressure. At block 116, the error counter-cavity 32 is sealed under vacuum at the calibration pressure PCal2 by sealing the cover 34 over the error counter-cavity 32 in any suitable manner.

Thus the calibration method 110 pressurizes the sealed sensor cavity 22 and the sealed error cavity 24 at the same pressure, and seals the error counter-cavity 32 at a suitable calibration pressure. The difference between the pressure of the error counter-cavity 32 and the pressure of the error cavity 24 as measured at diaphragm 42 is the pressure error D2 of the pressure sensor assembly 10 because any pressure leakage experienced at the error cavity 24 will be the same as, substantially similar to, or directly proportional to any pressure leakage (also known as "offset drift") of the sensor cavity 22.

Figure 3:
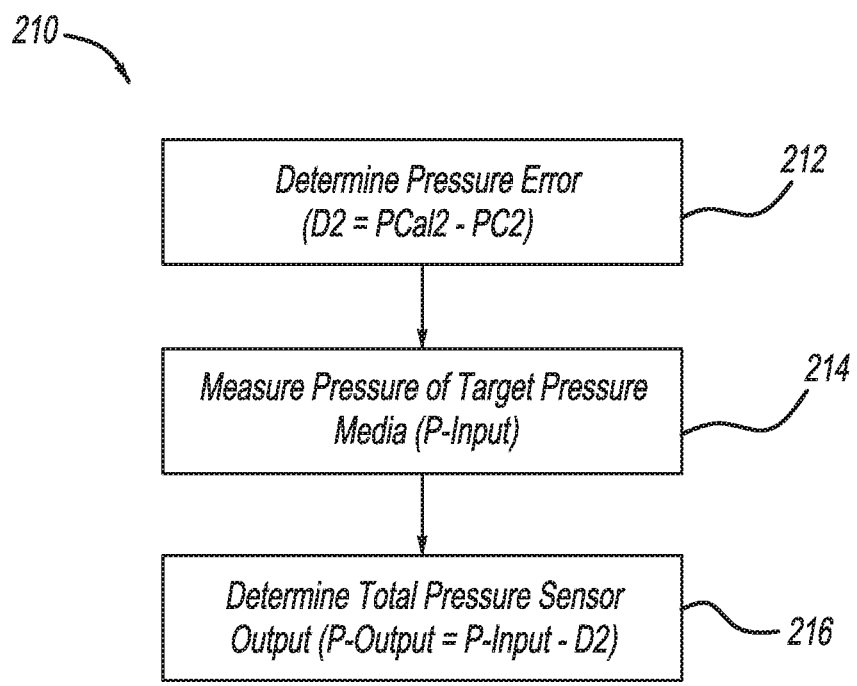
FIG. 3 is a method for determining an output of the pressure sensor assembly of FIG. 1.

With additional reference to FIG. 3, a method for determining total pressure sensor output (P-Output) of the sensor assembly 10 is illustrated in FIG. 3 at reference numeral 210. The method 210 can be performed by the control module 70, or in any other suitable manner by any suitable control device. With initial reference to block 212, pressure error D2 as measured by diaphragm 42 of the sensor assembly 10 is the difference between the pressure of the error counter-cavity 32, which is the calibration pressure PCal2, and the pressure of the error cavity 24, which may be the calibration pressure PC2 or less if the error cavity 24 has experienced pressure loss. The resistors 56 generate input D2 to the control module 70, which is conducted thereto by the connectors 60 in contact with sensor electrodes 52.

At block 214, pressure of the target media is measured at the sensor diaphragm 40. Specifically, the target media is within the sensor counter cavity 30, and pressure of the media is sensed at the diaphragm 40 by the sensor resistors 54. The resistors 54 generate an input (P-input) to the control module 70, which is conducted to the control module 70 by the connectors 60 in contact with sensor electrodes 50.

At block 216, the measured pressure (P-input) is modified by the control module 70 to take into account any pressure leakage of the sensor cavity 22, which is represented by the pressure error D2 determined at block 212. Specifically, at block 216 the control module 70 generates a final sensor output (P-output) of the sensor 10 representing pressure of the target media that is equal to a difference between the measured pressure of the target media (P-input) and the pressure error determined at block 212. The present teachings thus advantageously provide for an absolute pressure sensor assembly 10 configured to generate a total pressure sensor output (P-output) representing pressure of the target pressure media that takes into account any possible offset drift experienced by the sensor assembly 10, such as due to pressure loss of the sensor cavity 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An absolute pressure sensor assembly comprising:
   a first diaphragm between a sensor cavity sealed under vacuum and a pressure media to be measured;
   a first strain gauge of the first diaphragm configured to measure pressure of the pressure media relative to pressure of the sensor cavity;
   a second diaphragm between an error cavity sealed under vacuum and an error counter-cavity sealed under vacuum; and
   a second strain gauge of the second diaphragm configured to measure pressure of the error counter-cavity relative to the error cavity to identify a pressure error of the absolute pressure sensor assembly;
   wherein the absolute pressure sensor assembly is configured to generate a pressure output that includes the pressure of the pressure media as measured by the first strain gauge modified by the pressure error measured by the second strain gauge.

2. The absolute pressure sensor of claim 1, wherein the first diaphragm and the second diaphragm are on a single substrate.

3. The absolute pressure sensor of claim 1, wherein the first strain gauge and the second strain gauge include electrodes.

4. The absolute pressure sensor of claim 1, further comprising a sensor counter-cavity opposite to the sensor cavity;
   wherein the sensor counter-cavity is configured to receive the pressure media to be measured.

5. The absolute pressure sensor of claim 1, wherein the pressure media to be measured includes at least one of air, oil, and hydraulic fluid.

6. The absolute pressure sensor of claim 1, wherein the absolute pressure sensor assembly is calibrated with the sensor cavity and the error cavity at the same pressure.

7. The absolute pressure sensor of claim 1, wherein the sensor cavity and the error cavity are configured such that pressure loss of the sensor cavity is directly proportional to pressure loss of the error cavity.

8. The absolute pressure sensor of claim 1, further comprising a control module configured to generate the pressure output by modifying measurement of the first strain gauge to take into account the pressure error.

9. The absolute pressure sensor of claim 8, wherein the pressure error compensates for loss of pressure of the sensor cavity, which corresponds to loss of pressure of the error cavity.

* * * * *